United States Patent
Burstein et al.

(10) Patent No.: US 7,665,492 B2
(45) Date of Patent: Feb. 23, 2010

(54) FUEL NOZZLE SUPPORT FUNNEL

(75) Inventors: Justin Burstein, Palo Alto, CA (US);
Steven A. Huber, Houston, TX (US);
Katie Strausser, Houston, TX (US);
John P. Thornton, Califon, NJ (US);
Matthew T. Ware, Pasadena, CA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 208 days.

(21) Appl. No.: 11/959,596

(22) Filed: Dec. 19, 2007

(65) Prior Publication Data
US 2008/0173374 A1 Jul. 24, 2008

Related U.S. Application Data

(60) Provisional application No. 60/883,203, filed on Jan. 3, 2007.

(51) Int. Cl.
*B65B 1/04* (2006.01)
*B65B 3/00* (2006.01)
(52) U.S. Cl. .......... 141/332; 141/340; 220/86.2
(58) Field of Classification Search ......... 141/331–345; 220/86.2
See application file for complete search history.

(56) References Cited

U.S. PATENT DOCUMENTS

| | | | | |
|---|---|---|---|---|
| 1,733,261 A * | 10/1929 | Higby et al. | ................. | 141/337 |
| 2,902,062 A * | 9/1959 | Smekal | ......................... | 141/105 |
| 3,334,779 A * | 8/1967 | Smith | ........................ | 220/86.2 |
| 4,112,984 A * | 9/1978 | Guglia et al. | ................. | 141/98 |
| 4,892,216 A | 1/1990 | Scott | | |
| 4,971,118 A * | 11/1990 | Cluff | .......................... | 141/103 |
| 7,082,973 B2 * | 8/2006 | Ganachaud et al. | ......... | 141/350 |
| 7,530,375 B2 * | 5/2009 | Aitken et al. | ................. | 141/371 |
| 7,540,311 B2 * | 6/2009 | Quigg | ......................... | 141/287 |

* cited by examiner

*Primary Examiner*—Timothy L Maust
(74) *Attorney, Agent, or Firm*—Jeffrey P. Calfa; Mark C. Bach

(57) ABSTRACT

The fuel nozzle support funnel comprises a top conical section and a bottom smaller opening neck section. The top conical section has a top rim configured to seat over the fuel inlet opening of a truck fuel tank with the top conical section extending into the fuel tank. The bottom smaller opening neck section depends into the tank from a bottom smaller opening edge of the top conical section and has an inner sleeve therein made of a frictional material non reactant with diesel fuel. The inner sleeve and surrounding smaller opening neck section are of a diameter sufficient to allow passage therethrough of a fuel nozzle of a fuel pump. The top conical section has a plurality of openings therein through which air can escape during fueling to maintain the pressure within the tank constant.

14 Claims, 4 Drawing Sheets

FUEL NOZZLE SUPPORT FUNNEL

CROSS REFERENCE TO RELATED APPLICATION

This application claims priority from provisional U.S. Application Ser. No. 60/883,203, filed Jan. 3, 2007 and entitled The Fueling Experience, the teachings of which are incorporated by reference.

BACKGROUND OF THE INVENTION

1. Field of the Invention

The present invention relates to a fuel nozzle support funnel. More particularly, the support funnel comprises a structure with a conical section on top and a smaller opening neck at the bottom for use in frictionally maintaining a fueling nozzle within a large fuel tank opening of a truck fuel tank.

2. Prior Art

At present, there is no structure available for use in maintaining a fueling nozzle securely within the large opening of a truck fuel tank. Such support structure is necessary because the fuel nozzle could disengage from within the fuel tank due to fuel surges through the nozzle, a driver getting into or out of the cab of the truck, etc., creating undesirable and costly fuel spills.

It has been found that many drivers use a makeshift bungee cord solution to hold the fueling nozzle in the tank while fueling, if an adjacent structure to which the bungee cord may be attached is available. However, not every truck is capable of supporting the makeshift bungee cord solution.

Some trucks have a fuel tank inlet opening positioned rearwardly on the tank, or in some cases placed on the extreme rear area of the tank, accessible only by reaching around the trailing edge of a truck's fairing, or there is no grated stair subjacent the fuel tank inlet opening to which the bungee may be attached. In such configurations, the bungee cord system is not available for use.

Refueling stations also typically have a separate satellite fuel nozzle hooked up to the same pump, so that truckers can fuel two tanks simultaneously. In this scenario, where it is ideal for both tanks to be filled simultaneously, a secure means of maintaining a fuel nozzle within the fuel tank inlet opening becomes even more necessary.

There are several flaws associated with the makeshift bungee system. A driver may occasionally forget the bungee somewhere and lose it. The general solution against loss seems to be to leave the bungee attached to a stair all the time. However, the rubber stretched across the stair creates a hazard on the stair. Another issue is durability, in that bungee cords become old and give way after repeated heating and cooling cycles while also being stretched.

It can also become quite tiresome to manually support the weight of a fuel nozzle for the time it takes to fill a large truck fuel tank, which can take between 10 and 30 minutes, depending on tank size and pump flow rate, especially for an individual with decreased hand, arm, and/or shoulder strength.

Thus there has been found the need for a support structure for supporting a fueling nozzle effectively during the filling process.

SUMMARY OF THE INVENTION

According to the invention there is provided a fuel nozzle support funnel comprising a top conical section and a bottom smaller opening neck section, the top conical section having a top rim sized and configured to seat over an inwardly extending flange in the fuel inlet opening of a truck fuel tank, the top conical section extending into the fuel tank, the bottom smaller opening neck section depending into the tank from a bottom smaller opening edge of the top conical section, the bottom smaller opening neck section having an inner sleeve therein, which sleeve is made of a frictional material nonreactant with diesel fuel, the inner sleeve and surrounding smaller opening neck section being of a diameter sufficient to allow passage therethrough of a fuel nozzle of a fuel pump, and the top conical section having a plurality of openings therein through which air can escape during fueling to maintain the pressure within the tank constant. To assure that the support funnel is maintained in position within the fuel inlet opening and held against the flange, a snap ring is seated over the top rim of the conical section, and frictionally engages against an inner wall of the fuel inlet opening.

DESCRIPTION OF THE PREFERRED EMBODIMENT

Figure 1:
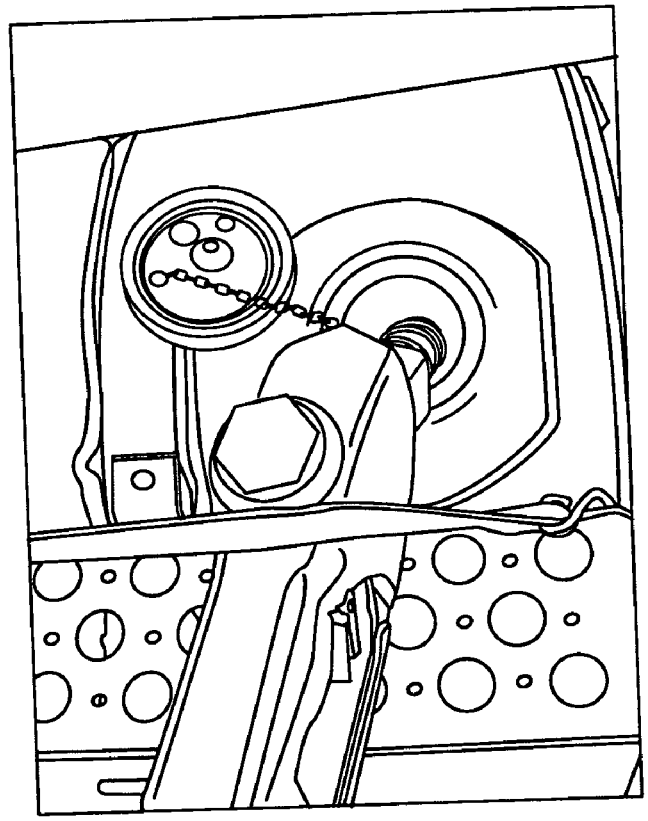
FIGS. 1 and 2 provide perspective views of a prior art makeshift bungee cord securement of a fuel nozzle within a fuel inlet opening of a truck fuel tank.
Figure 2:
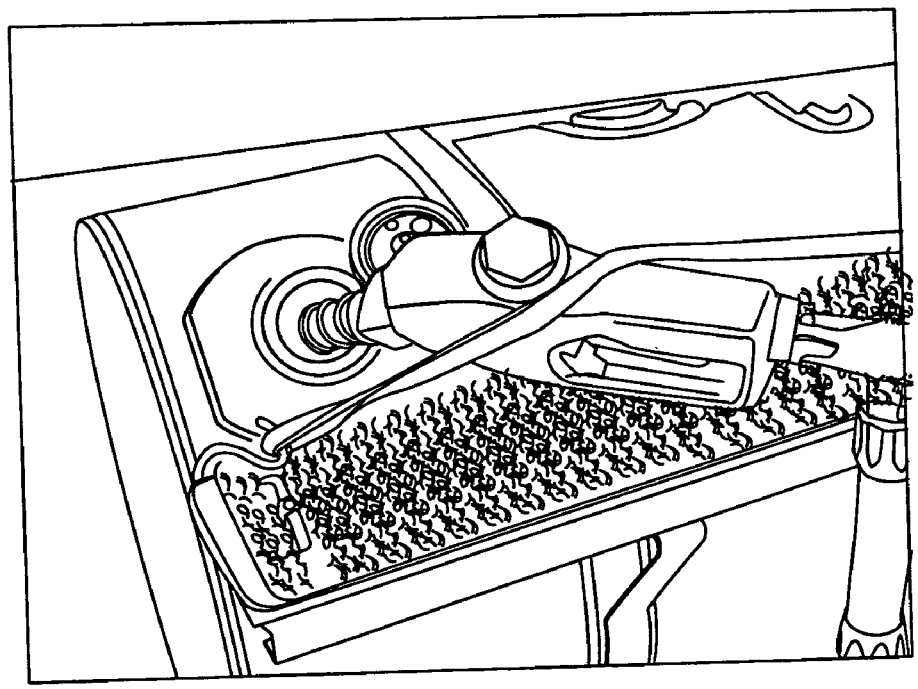

Referring now to the drawings in greater detail, FIGS. 1 and 2 show a makeshift prior art use of a bungee cord system for maintaining a fuel nozzle within a fuel tank inlet opening of a truck fuel tank. Such makeshift system is only functional where structure adjacent to the fuel inlet opening is structured in a manner to which a bungee cord may be securely attached, and has further drawbacks associated therewith as well, as iterated above.

Turning now to FIGS. 3-8, there is illustrated therein the fuel nozzle support funnel of the present invention generally identified by the reference numeral 10. In a preferred embodiment, the funnel 10 is a metal structure, preferably made of aluminum or steel, and comprises a conical section 12 on top and a smaller opening neck section 14 at the bottom. An upper edge or top rim 16 of the conical section 12 incorporates an outer shoulder 18 and is sized to seat upon an inwardly extending flange 20 within a neck 22 of a fuel inlet opening 24 of a fuel tank 26, the support funnel 10 depending into the fuel tank 26 from this point of engagement thereto. To assure that the shoulder 18 of the conical section 12 is maintained in position against the inwardly extending flange 20, a snap ring 28 is seated snugly over the top rim 16 of the conical section 12, and frictionally engages against an inner wall surface 30 of the neck 22 of the fuel tank inlet opening 24.

Figure 3:
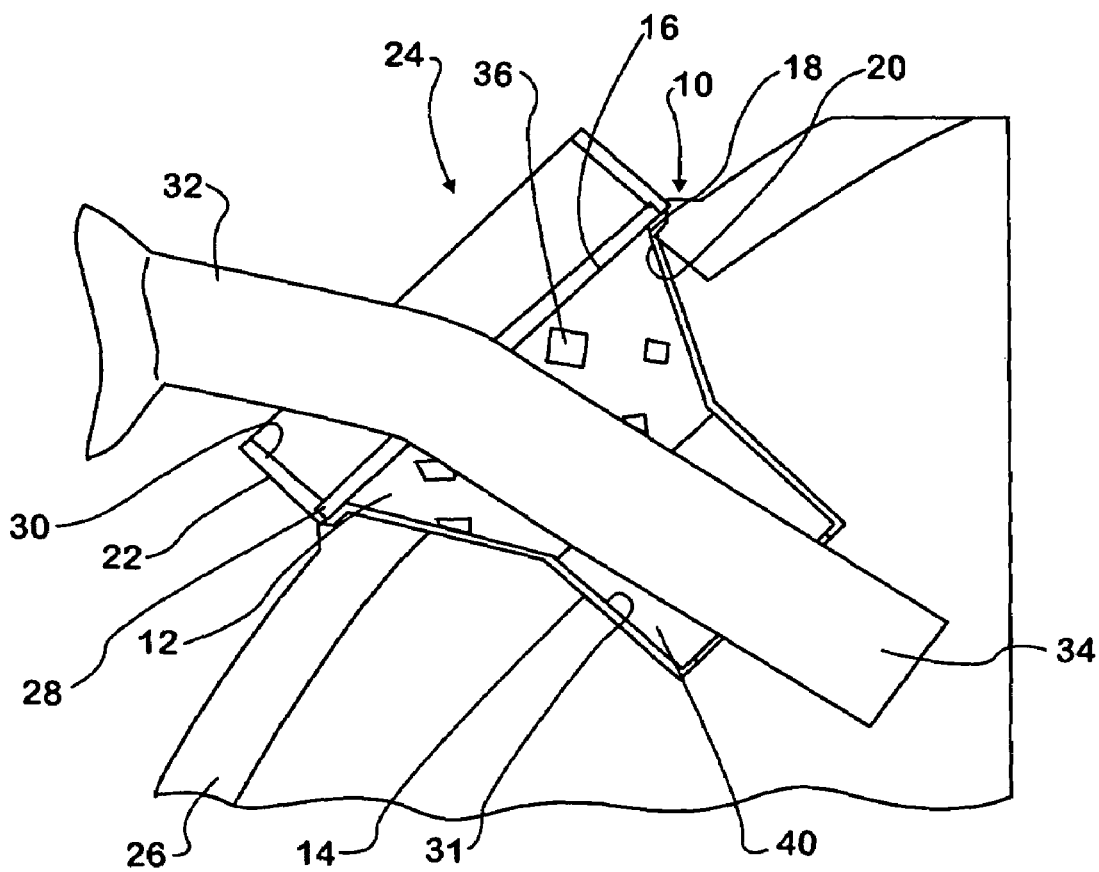
FIG. 3 is an enlarged cross sectional side view showing the fuel nozzle support funnel of the present invention in use, engaged securely within the fuel inlet opening of a truck fuel tank and showing a fuel nozzle securely held thereby.
Figure 4:
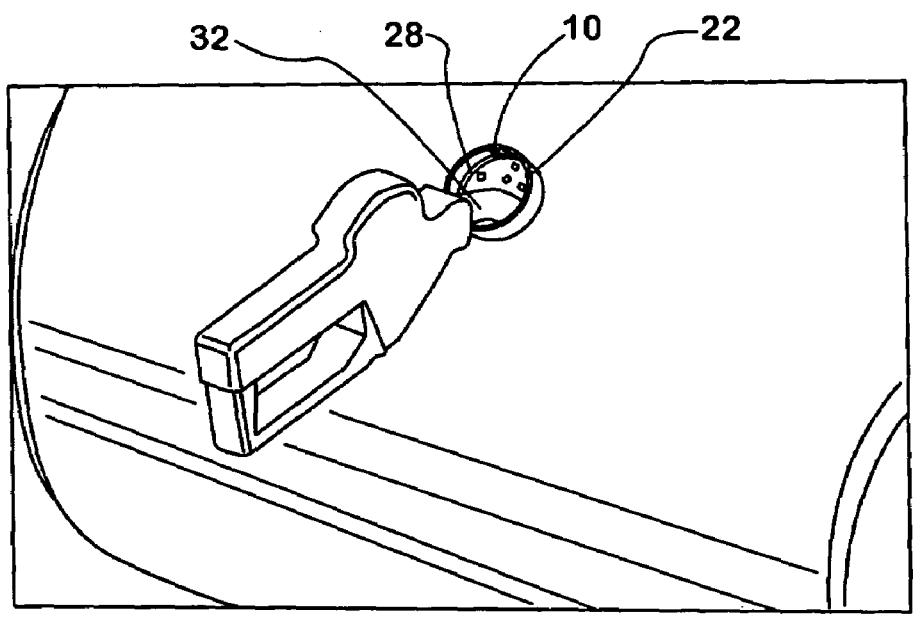
FIG. 4 is a perspective view showing the fuel nozzle support funnel in use, engaged securely within the fuel inlet opening of a truck fuel tank and showing a fuel nozzle securely held thereby.
Figure 5:
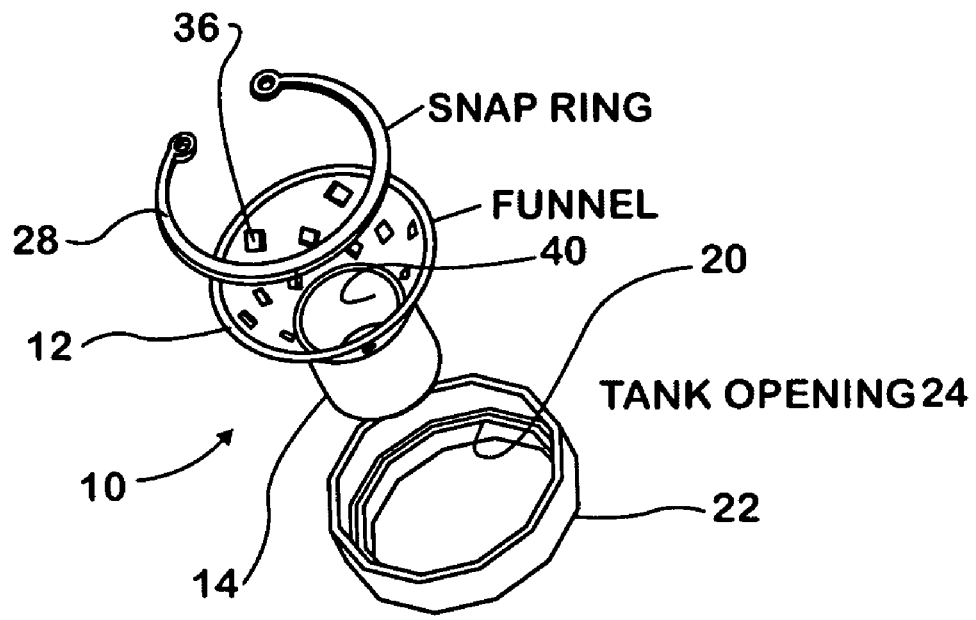
FIG. 5 is an exploded perspective view of the fuel nozzle support funnel of FIG. 2.
Figure 6:
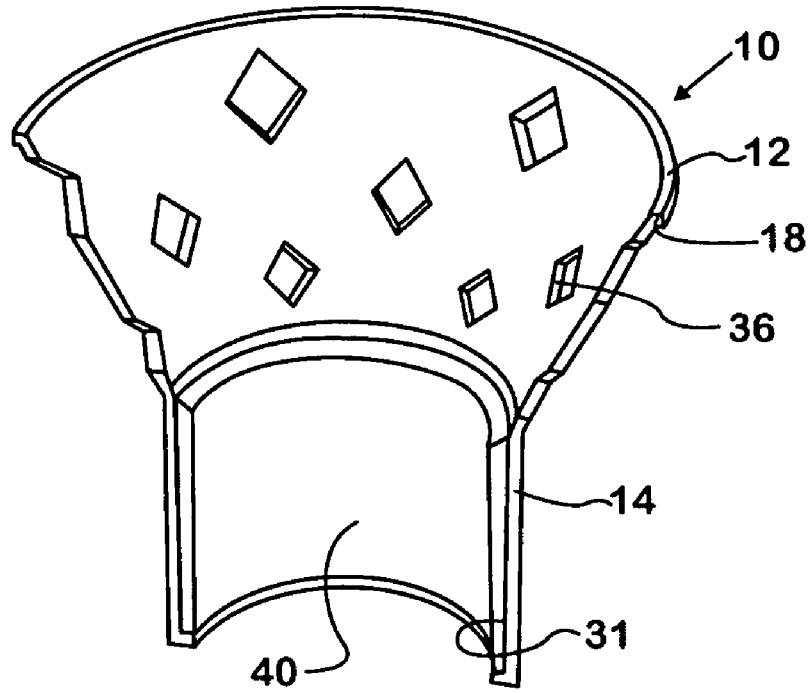
FIG. 6 is an enlarged sectional view of the fuel nozzle support funnel of FIG. 5, showing an inner sleeve of a bottom smaller diameter neck section, the neck section depending from a bottom edge of a top conical section of the support funnel.
Figure 7:
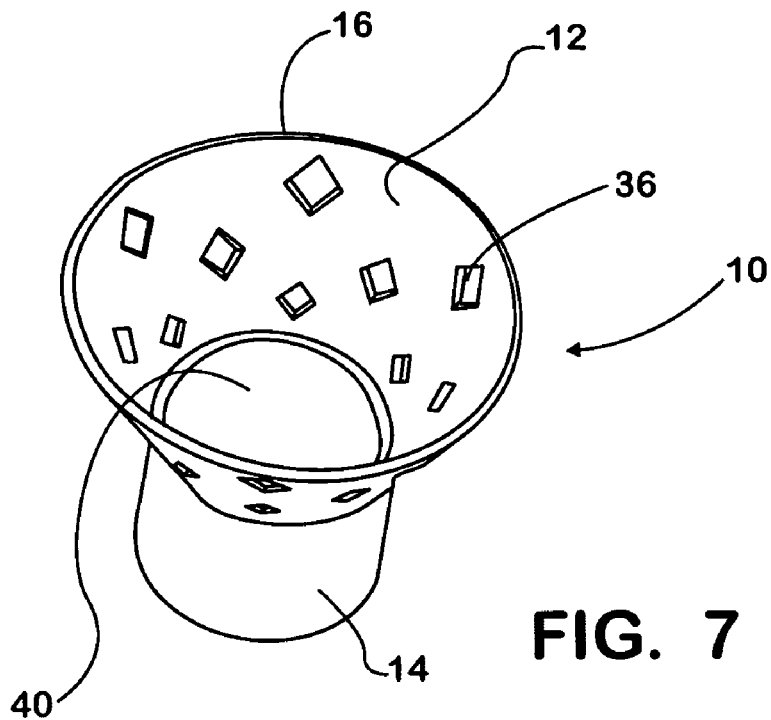
FIG. 7 is a further perspective view of the fuel nozzle support funnel.
Figure 8:
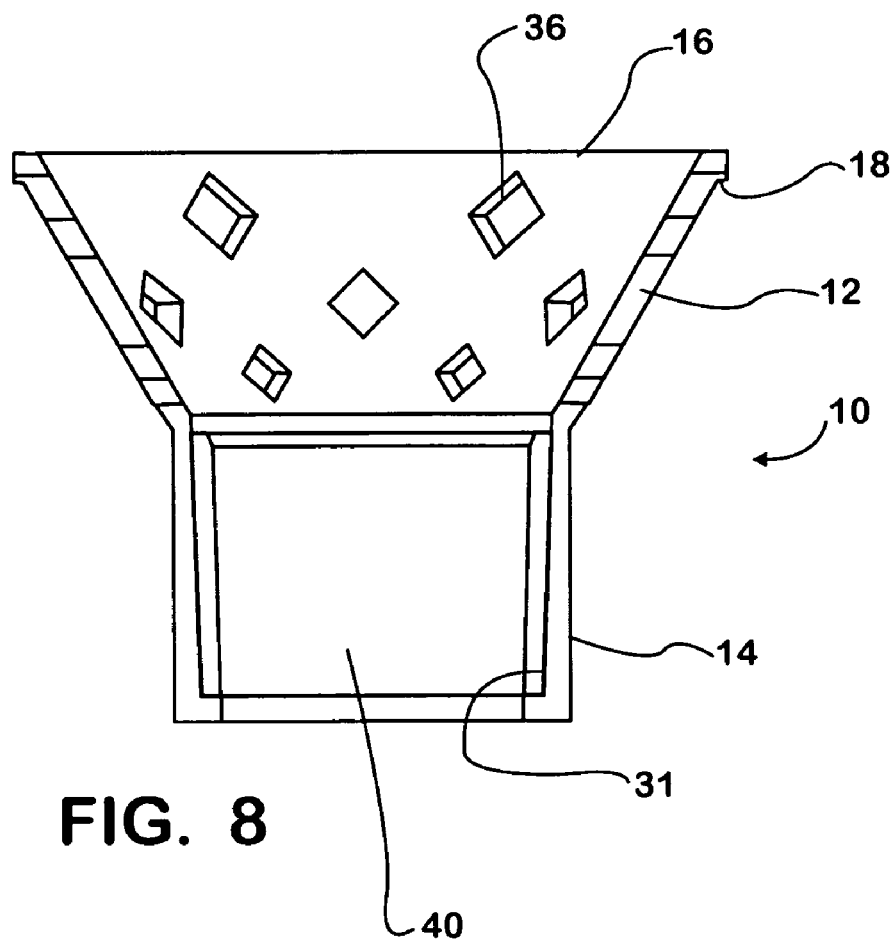
FIG. 8 is an enlarged longitudinal cross sectional view through the fuel nozzle support funnel.

A fuel nozzle 32 inserted into and through the conical section 12 is guided into the fuel tank 26 via the neck portion 14, against an interior frictional sleeve 40 thereof, against which the nozzle 32 frictionally engages once positioned within the fuel tank 26, at least one, and preferably two, points, as illustrated best in FIG. 3; at a top center bottom end point and at a bottom center top end point, labeled X and Y, respectively, maintaining the fuel nozzle 32 engaged within the fuel tank 26 against forces which might otherwise unseat it, such as fuel surges through the nozzle 32, a driver stepping into or out of the truck cab, etc.

The lining or sleeve 40 of the neck section 14 is made of frictional material, on at least an inner surface 31 thereof, to first prevent the nozzle 32 from scraping against the tank 26, protecting against wear and tear on both the tank 26 and nozzle 32 and preventing damage to a fuel level sensor (not shown) at the tip 34 of the nozzle 32. The sleeve 40 will also provide necessary friction at point(s) of contact X and Y with the nozzle 32 to maintain the nozzle 32 engaged in the fuel tank 26. The frictional material, in a preferred embodiment is a rubber, and preferably a fluoroelastomer, which is the preferred substance for use with diesel fuel, although any suitable rubber like, frictional material which does not react with diesel fuel, resists corrosion and wear from oil, gas, dirt, freezing/heating, and rubbing against the nozzle 32 may be used. The rubber, in a preferred embodiment, should have a thickness of approximately $1/16$" and a height of approximately $1 1/4$".

The funnel 10 is preferably positioned at an angle of approximately 30 degrees, in a preferred embodiment, to provide an adequate slope to help guide the fuel nozzle 32 into the tank 26. The conical section 12 is also provided with a plurality of openings 36 therein which allow air to escape from the tank 26 as fuel is added, maintaining a constant pressure in the fuel tank 26. These openings 36 are small enough that the fuel nozzle 32 cannot lodge therein and are pointed into the tank 26 to help guide the nozzle 32 into the smaller opening neck section 14, if the nozzle 32 does hit the openings 36 while being inserted through the funnel 10. The openings 36, in a preferred embodiment, are diamond shaped.

It is contemplated that the funnel 10 will be manufactured using a deep draw process, a cost effective means of manufacturing. After the metal funnel 10 has been shaped, the openings 36 can be punched out and the rubber lining or sleeve 40 can be added, preferably using an oil/gas resistant adhesive.

In order to engage the fuel nozzle support funnel 10 to the tank 26, the snap ring 28 is used, much the same way existing anti-siphon devices are attached. The funnel 10 could also be welded on to a fuel tank 26.

It will be understood that fuel nozzles vary in outer diameter, varying between approximately $13/16$" and approximately 1". The length of fuel nozzle 32 that engages within the tank 26 typically measures 1.7", with the diameter along this length of fuel nozzle 32 remaining constant. It has been determined through empirical testing that only an approximately $3/16$" variance is required.

Thus the neck section 14 of the funnel 10 is designed to be slightly larger than the nozzle 32 diameter to account for such variations in size and to make it easier to insert the nozzle 32. Within this slightly over-sized neck section 14 is fixed the narrower frictional sleeve 40 to create the increased friction needed to hold the nozzle 32 in place. The sleeve 40 is also preferably thin enough to give somewhat during insertion of the nozzle 32, yet resistant to wear due to repeated rubbing from the metal fuel nozzle 32.

A prototype of the support funnel 10 was created for empirical testing, and was sized and configured for use with an available fuel tank 26. From empirical testing, it is contemplated that the funnel 10 will be approximately 2.5 inches in length, with the conical section 12 and smaller opening neck section 14 being of substantially similar length, approximately 1.25 inches each, in length. Also it was determined that the inner diameter of smaller opening neck section 14 should be approximately $1 5/16$" to universally accommodate for variously dimensioned fuel nozzle 32 configurations and have a $1/16$" inch thick sleeve 40 therein, providing a final outer diameter of $1 3/8$". It will be obvious to those skilled in the art that the diameter of the top 16 of the conical section 12 may be variable, to accommodate seating on the interior flange 20 of whatever fuel tank neck 22 configuration it will be used in, to maintain same from being too small, and potentially falling into the tank 26. Therefore it will be further understood that the dimensions set forth in FIG. 8, pertain only to the prototype designed, and should not be construed as limiting.

An analysis to ensure that the openings 36 provided sufficient area for the air to flow out and maintain a safe internal fuel tank 26 pressure while fueling was conducted. The area of the particular fuel nozzle 32 used in empirical study was 0.749 in2. The total open area created by the openings 36, as proposed for the prototype, was 1.06 in2. Also it will be understood that further open areas exist around the nozzle 32 where it enters into the tank 26 and support funnel 10. These open areas also allow air in the fuel tank 26 to exit the fuel tank 26, maintaining the desired substantially equalized pressure. Therefore, the airflow out of the fuel tank 26 remains sufficient in volume despite the nozzle support funnel 10 covering much of the fuel inlet opening 24 of the fuel tank 26.

The ability to frictionally maintain the fuel nozzle 32 in the fuel tank 26 while fueling gives the driver extra time to check on other things while fueling without the nozzle 32 becoming disengaged and spilling fuel. Therefore, environmentally, the funnel 10 will significantly decrease the chances of fuel spills, which have a large negative environmental and financial impact. Also, the need for the makeshift bungee cord support has been eliminated, eliminating the need for frequent replacement, decreasing waste.

The factors considered during development of the funnel 10 are: prevention of fuel spills, conforming to regulations, simple to use, adaptable to various trucks and fuel nozzles, cost, reliability, durability, aesthetics, minimal to no interference with other systems, and feasibility. The funnel 10 meets all of these criteria.

As described above, the funnel 10 provides a number of advantages, some of which have been described above, and others of which are inherent in the invention. Also, modifications may be proposed to the funnel 10 without departing from the teachings herein. Accordingly the scope of the invention is only to be limited as necessitated by the accompanying claims.

We claim:

1. A fuel nozzle support funnel comprising a top conical section and a bottom smaller opening neck section, the top conical section having a top rim configured to seat over and against an interior inwardly extending flange of a neck of a fuel inlet opening of a truck fuel tank, the top conical section extending into the fuel tank, the bottom smaller opening neck section depending into the tank from a bottom smaller opening edge of the top conical section, the bottom smaller opening neck section incorporating an inner sleeve, which sleeve is made of a frictional material non reactant with diesel fuel, the inner sleeve and surrounding smaller opening neck section being of a diameter sufficient to allow passage therethrough of a fuel nozzle of a fuel pump, the sleeve frictionally engaging the fuel nozzle to maintain same in position within the fuel tank, the top conical section having a plurality of openings therein through which air can escape during fueling to maintain pressure within the tank constant, wherein the top rim of the top conical section incorporates a shoulder therein, and wherein a snap ring seats over the top rim of the top conical section, frictionally engaging against an inner wall of the neck of the fuel inlet opening, to securely maintain the support funnel in position against the inner flange of the neck.

2. The fuel nozzle support funnel of claim 1 wherein the outer diameter of the neck section is approximately 1⅜ inch.

3. The fuel nozzle support funnel of claim 1 wherein the thickness of the frictional material sleeve is approximately 1/16 inch.

4. The fuel nozzle support funnel of claim 1 wherein the frictional material sleeve is rubber.

5. The fuel nozzle support funnel of claim 4 wherein the frictional material sleeve is a fluoroelastomer.

6. The fuel nozzle support funnel of claim 4 wherein the inner diameter of the sleeve is approximately 1 5/16 inch.

7. The fuel nozzle support funnel of claim 1 wherein the plurality of openings in the top conical section have an approximate total area of 1.06 in2.

8. The fuel nozzle support funnel of claim 1 wherein the top rim of the top conical section has a diameter larger than an inner diameter flange of the neck and an outer diameter slightly less than or equal to an inner diameter of the fuel inlet opening within which it is engaged.

9. The fuel nozzle support funnel of claim 1 having a length sufficient to frictionally engage a fuel nozzle terminal end portion against at least one point along the frictional sleeve within the smaller opening neck section.

10. The fuel nozzle support funnel of claim 9 having a length of approximately 2.5 inches.

11. The fuel nozzle support funnel of claim 10 wherein the top conical section 12 and the bottom neck section are approximately equal in length.

12. The fuel nozzle support funnel of claim 9 wherein the frictional sleeve engages the fuel nozzle terminal end portion at least two points.

13. The fuel nozzle support funnel of claim 12 being maintained within the fuel tank at an approximately 30 degree angle.

14. The fuel nozzle support funnel of claim 13 wherein the sleeve engages the nozzle at a top center bottom end point and at a bottom center top end point.

* * * * *